April 8, 1969 R. C. SHAW ET AL 3,437,958

PHASE MODULATOR INCLUDING A DRIVER AND A DRIVEN OSCILLATOR

Filed Sept. 27, 1966 Sheet 1 of 2

INVENTORS R.C. SHAW
H. L. STOVER
BY
Sylvan Sherman
ATTORNEY

United States Patent Office 3,437,958
Patented Apr. 8, 1969

3,437,958

PHASE MODULATOR INCLUDING A DRIVER AND A DRIVEN OSCILLATOR

Robert C. Shaw, Colts Neck Township, Monmouth County, N.J., and Harry L. Stover, Dallas, Tex., assignors to Bell Telephone Laboratories, Incorporated, Murray Hill, N.J., a corporation of New York Filed Sept. 27, 1966, Ser. No. 582,404
Int. Cl. H03c 3/02
U.S. Cl. 332—16 6 Claims This invention relates to phase modulators.

In the copending application by W. D. Warters, Ser. No. 568,893, filed July 29, 1966, there is described a differential phase modulated communications system using frequency modulation techniques (FM–DPS). As noted in said copending applicaion, it is an advantage of such a system that the conversion from baseband pulses to differential phase modulated carrier signal can be performed directly by frequency modulating a voltage controlled oscillator. The present invention provides an alternative arrangement for directly converting baseband pulses to differential phase modulated carrier signal by means of an unlocked oscillator, driven by an external signal.

In accordance with one aspect of the invention, an oscillator, free running at a frequency $f_0$, is driven by at least one external signal source whose frequency is different than $f_0$. The effect produced is to pull the frequency of the driven oscillator an amount which depends upon the frequency difference between the driving and driven oscillators, and the relative magnitudes of the two signals. The net phase shift produced thereby is the integral of the frequency deviation over a prescribed time internal.

In a pulse communications system, the frequency of the driving signal source is a function of the amplitude and/or polarity of the pulses making up the encoded information, and the time interval of interest is equal to one time slot.

In one specific embodiment of the invention, to be described in greater detail hereinbelow, the information is encoded as a polar binary signal, and the modulator is adjusted to produce phase shifts of $\pm\pi/2$ radians. It is understood, however, that this is by way of illustration only and that a phase modulation system in accordance with the invention can be extended to accommodate unipolar and multilevel baseband encoded signals equally as well.

These and other objects and advantages, the nature of the present invention, and its various features, will appear more fully upon consideration of the various illustrative embodiments now to be described in detail in connection with the accompanying drawings, in which.

Figure 1:
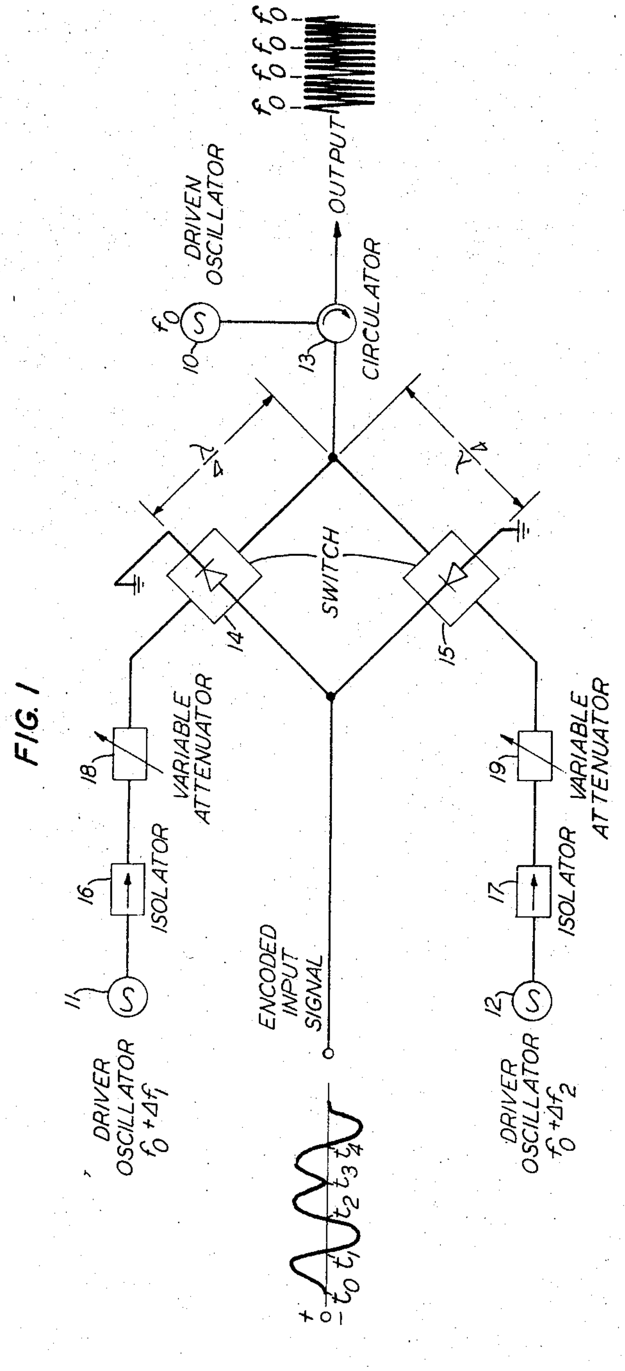
FIG. 1 shows an embodiment of the invention using two driver oscillators.

Referring to the drawings, FIG. 1 shows, in block diagram, one embodiment of a phase modulator in accordance with the invention. Basically, the modulator comprises a free-running, driven oscillator 10 which is coupled to a pair of driver oscillators 11 and 12 by means of a circulator 13 and a pair of switches 14 and 15. Also included in the respective driver circuits are isolators 16 and 17, and variable attenuators 18 and 19, all of which are desirable, although not essential to the operation of the invention.

The encoded input signal, which typically comprises a sequence of pulses, is applied to both switches 14 and 15 in a manner to couple only one of the driver oscillators to oscillator 10. In the embodiment of FIG. 1, the input signal is illustrated as a polar binary signal consisting of both positive and negative pulses.

It is known that the frequency of a free-running oscillator can be pulled (changed) by means of an externally applied signal whose frequency is near that of the free-running oscillator, and whose amplitude is considerably less than the amplitude of the free-running oscillator. (See "Theoretical Explanation for the Output Spectra of Unlocked Driven Oscillators," by H. L. Stover, February 1966, Proceedings of the Institute of Electrical Engineering and Electronics, pages 310–311.) The present invention makes use of this phenomenon to produce phase modulation.

Referring again to FIG. 1, the input signal pulses are coupled to both switches 14 and 15. For purposes of illustration, a waveguide system is considered in which each switch comprises a diode that extends transversely across the waveguide at a point that is preferably a quarter wavelength ($\lambda/4$) away from the junction of the two driver oscillator circiuts at the frequency of interest. The diodes are oppositely poled so that for each polarity pulse, one of them is driven to conduction, thereby placing a short circuit across the waveguide, while the other remains open-circuited. In the embodiment of FIG. 1, a positive pulse causes the diode associated with switch 15 to conduct, thereby shorting that branch of the modulator and disconnecting driver oscillator 12 from the circuit. Thus, in the presence of a positive pulse switch 15 is, in effect, "open." On the other hand a positive pulse back-biases the diode associated with switch 14 thereby preventing conduction. Thus, in the presence of a positive pulse, switch 14 is, in effect, "closed," thereby connecting oscillator 11 to oscillator 10.

Figure 2:
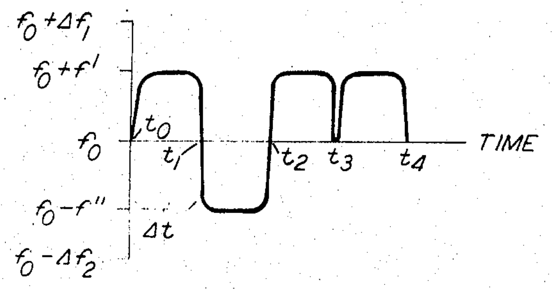
FIG. 2 shows the instantaneous frequency of the driven oscillator as a function of time.

For the particular encoded input signal shown in FIG. 1, the first time slot, $t_0$ to $t_1$, contains a positive pulse. Thus, during the time interval $t_0$ to $t_1$, switch 15 is open, disconnecting driver oscillator 12 from the circuit, where-instantaneousl frequency of oscillator 10 as a function to oscillator 10 through circulator 13. As the driver oscillator 11 is tuned to oscillate at a frequency $\Delta f_1$ cycles per second higher than the free-running frequency of as switch 14 is closed, connecting driver oscillator 11 tends to increase the frequency of oscillator 10. This is illustrated in FIG. 2, which is a representation of the instantaneous frequency of oscillator 10 as a function of time.

As illustrated therein, the instantaneous frequency of oscillator 10 at time $t_0$ to $f_0$. As the first pulse is applied, switch 14 closes, connecting driver oscillator 11 to oscillator 10 causing the frequency of the latter to increase from $f_0$ to $f_0+f'$, where $f'$ is given by Stover, in his above-cited article, as $$f'=k\cdot\frac{f_0^2}{\Delta f_1}\cdot\frac{P_{11}}{P_{10}} \quad (1)$$

where $k$ is a constant, and $P_{11}$ and $P_{10}$ are the powers of the driver signal and driven signal, respectively.

This increase in frequency occurs in a matter of a few cycles of the driven oscillator and persists until the amplitude of the input pulse decreases to the level at which switch 14 opens. This removes the driver signal from oscillator 10, resulting in a return of oscillator 10 to its free-running frequency $f_0$. The return to frequency $f_0$ also occurs in a matter of a few cycles, and results in the frequency-time variation shown in FIG. 2.

At time $t_1$ the second pulse is applied to switches 14 and 15. Since it is a negative pulse, switch 14 remains open, whereas switch 15 closes, resulting in oscillator 12 being coupled to oscillator 10. The effect again is to pull the frequency of oscillator 10, but in a direction to reduce its instantaneous frequency, as illustrated in FIG. 2.

As is known, a frequency varying signal $f(t)$ undergoes a phase shift $\Delta\varphi$ relative to a reference signal, at frequency $f_0$, that is given by $$\Delta\varphi=2\pi\int_{t_n}^{t_m}[f(t)-f_0]dt \quad (2)$$

where the integration is over the time interval $t_n$ to $t_m$. With respect to the modulator of FIG. 1, the integration is taken over one time slot $\Delta t$. When this is done for the first pulse, it is found that the phase of the output signal $f_0$ at time $t_1$ is advanced relative to what it would have been in the absence of the frequency modulation of oscillator 10. Similarly, the frequency modulation of oscillator 10 during the time interval $t_1$ to $t_2$ tends to retard the phase of the signal so that the signal at $t_2$ is phase delayed with respect to an unmodulated signal.

Since optimum noise immunity is obtained in a binary differential phase modulated system when the two possible signal states are anti-correlated, that is, when the two possible values of $\Delta\varphi$ differ by 180 degrees, the amplitude and frequency of the signal coupled from the driver oscillators to the driven oscillator are advantageously adjusted such that the magnitudes of hte integrated frequency deviations in the positive and negative directions sum to $\pi$ radians. That is $$\Delta\varphi_{+}+\Delta\varphi_{-}=\pi \quad (3)$$

where $$\Delta\varphi_{+}=2\pi\int_{\Delta t}(\Delta f_1-f_0)dt \quad (4)$$

and $$\Delta\varphi_{-}=2\pi\int_{\Delta t}(f_0-\Delta f_2)dt \quad (5)$$

It is a feature of the present invention that the total differential phase shift, $\pi$, can be achieved by adjusting the operational parameters of the driver oscillator such that $$\Delta\varphi=\pi/2 \text{ and } \Delta\varphi_{-}=-\pi/2 \quad (6)$$

or by adjusting them to produce some other, unequal division of the total phase shift between the two pulse polarities. In general, the total phase shift may be divided such that either.

$$\Delta\varphi_{+}>\pi/2 \text{ and } \Delta\varphi_{-}<\pi/2$$

or $\Delta\varphi_{+}>\pi/2$ and $\Delta\varphi<\pi/2$ where $$\Delta\varphi_{+}+\Delta\varphi_{-}=\pi$$

in both cases.

The output from oscillator 10 is coupled by way of circulator 13 to the output terminal of the phase modulator and comprises a substantially constant amplitude signal whose frequency deviates about its free-running frequency $f_0$ in accordance with the encoded input signal. Typically, a filter (not shown) is included in the output circuit to keep the driver signal energy and other unwanted sidebands out of the rest of the system.

In the embodiment of FIG. 1, the frequency of the driver oscillator 10 is increased or decreased by changing the frequency of the driver signal. To accomplish this, two separate driver oscillators 11 and 12 are used. However, since the change in frequency produced in the driven oscillator is also a function of the amplitude of the driver signal, the same operation can be obtained by modulating the amplitude of the driver signal applied to oscillator 10. Such an arrangement is disclosed in the second embodiment of the invention illustrated in FIG. 3.

As in FIG. 1, the driven oscillator 30 is coupled to a driver oscillator 31 through an isolator 32, a variable attenuator 33 and a circulator 34. However, in this embodiment only one driver oscillator is used, and the variable attenuator 33, sometimes referred to as a "variolosser," is a particular type of variable attenuator in which the attenuation can be varied as a function of the amplitude of a control current or voltage. Typically, such devices utilize the Faraday rotational effects produced by gyromagnetic materials to change the direction of polarization of a propagating electromagnetic wave relative to the plane of a lossy card. Other types of variolossers are known and are described in the literature. See, for example, "The TM-1/TL-2 Short Haul Microwave System," by R. W. Friis et al., published in the January 1966 issue of the Bell System Technical Journal, at page 53.

Figure 3:
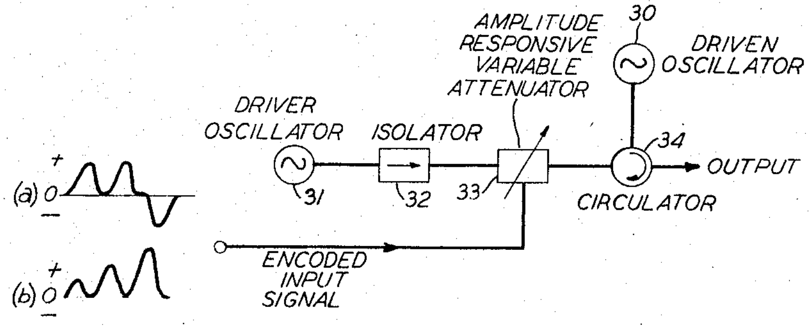
FIG. 3 shows a second embodiment of the invention using one driver oscillator.

As used in FIG. 3, the variolosser is controlled by the encoded input signal. In a first mode of operation, in which a polar binary signal *a* is applied to the variolosser, the attenuation of the variolosser is adjusted such that some reference level of driver signal is coupled to the driven oscillator. This reference amplitude pulls the frequency of the driven oscillator from its free-running frequency $f_0$ to a different frequency somewhere between $f_0$ and the driver frequency, as given by Equation 1. This establishes a reference frequency for no modulation. Upon the application of the encoded input signal, the attenuation of the variolosser is caused to vary, increasing for one polarity of input signal, and decreasing for the opposite polarity of input signal. As the attenuation decreases, the amplitude of the driver signal coupled to oscillator 30 increases, thereby causing the frequency of the driven oscillator to deviate from its no-modulation frequency towards the driver frequency. On the other hand, as the attenuation increases, the amplitude of the driver signal coupled to oscillator 30 decreases, causing the frequency of the driven oscillator to deviate from its no-modulation frequency in a direction away from the driver frequency. The output signal is, thus, in all respects similar to that produced by the embodiment of FIG. 1 with the advantage that only one driver oscillator is used.

The embodiment of FIG. 3 has a second mode of operation in which the encoded input is a multilevel signal typified by input waveform *b*. In this second mode of operation, the multilevel unipolar input pulses are applied to the variolosser as a control signal thereby varying the amplitude of the driver signal coupled to oscillator 30 as a function of pulse amplitude.

From the descriptions given hereinabove, it is seen that an unlocked oscillator can be used in many ways to convert baseband pulses to phase modulated high frequency signals in either binary or multilevel systems. Accordingly, it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A phase modulator for converting baseband pulses to phase modulated carrier signals comprising:

input means for receiving baseband pulses;

a driven oscillator having a free-running frequency $f_0$;

at least one driver oscillator operating at a frequency different than $f_0$;

and means responsive to said baseband pulses for coupling signals from said driver oscillator to said driven oscillator thereby changing the frequency of said driven oscillator.

2. The phase modulator according to claim 1 including two driver oscillators operating at frequencies $f_0+\Delta f_1$ and $f_0-\Delta f_2$, and including means responsive to said baseband pulses for connecting one or the other of said driver oscillators to said driven oscillator.

3. The phase modulator according to claim 2 wherein the phase shift produced by said modulator during each pulse interval is either $\Delta\varphi_+$ or $\Delta\varphi_-$ radians, where $\Delta\varphi_+ + \Delta\varphi_- = \pi$ radians.

4. The phase modulator according to claim 1 wherein the frequency of the driver signal coupled to said driven oscillator is varied in response to said baseband signal.

5. The phase modulator according to claim 1 wherein the amplitude of the driver signal is varied in response to said baseband signal.

6. The phase modulator according to claim 1 wherein said baseband pulses are multilevel pulses;

and wherein the amplitude of the signal coupled from said driver oscillator to said driven oscillator varies as a function of the amplitude of said baseband pulses.

References Cited

UNITED STATES PATENTS 2,938,171 5/1960 Royden ----------- 331—48 X

OTHER REFERENCES

Ives, "Tone-Modulated Frequency Calibrator," Electronics World, pp. 56, 57 and 96, October 1964. 331–47.

Stover, "Theoretical Explanation for the Output Spectra of Unlocked Driver Oscillators," Proc. of the IEEE, pp. 310–311, February 1966. 332–16.

ALFRED L. BRODY, *Primary Examiner.*

U.S. Cl. X.R.

325—145, 148; 331—47; 332—23